(12) United States Patent
Vasseur et al.

(10) Patent No.: US 12,363,006 B2
(45) Date of Patent: Jul. 15, 2025

(54) CAPTURING NETWORK DYNAMICS AND FORECASTING ACROSS MULTIPLE TIMESCALES

(71) Applicant: Cisco Technology, Inc., San Jose, CA (US)

(72) Inventors: Jean-Philippe Vasseur, Saint Martin d'Uriage (FR); Grégory Mermoud, Venthône (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 582 days.

(21) Appl. No.: 17/703,493

(22) Filed: Mar. 24, 2022

(65) Prior Publication Data

US 2023/0308359 A1 Sep. 28, 2023

(51) Int. Cl.
*H04L 41/14* (2022.01)
*H04L 41/0654* (2022.01)
*H04L 41/147* (2022.01)
*H04L 41/16* (2022.01)

(52) U.S. Cl.
CPC ........ *H04L 41/145* (2013.01); *H04L 41/0654* (2013.01); *H04L 41/147* (2013.01); *H04L 41/16* (2013.01)

(58) Field of Classification Search
CPC . H04L 41/145; H04L 41/0654; H04L 41/147; H04L 41/16; H04L 41/5009
See application file for complete search history.

(56) References Cited

U.S. PATENT DOCUMENTS

| | | | |
|---|---|---|---|
| 9,679,243 B2 | 6/2017 | Zou et al. | |
| 10,326,543 B2 | 6/2019 | Yang et al. | |
| 10,735,274 B2 | 8/2020 | Wulff et al. | |
| 10,805,804 B2 | 10/2020 | Zhang et al. | |
| 2004/0181370 A1* | 9/2004 | Froehlich | G06F 9/5083 702/187 |
| 2018/0247215 A1* | 8/2018 | Garvey | G06N 20/00 |
| 2020/0067793 A1* | 2/2020 | Dribinski | H04W 4/40 |
| 2020/0379839 A1* | 12/2020 | Savalle | H04L 12/4633 |
| 2021/0184915 A1 | 6/2021 | Fenoglio et al. | |
| 2023/0035691 A1* | 2/2023 | Savalle | H04L 45/22 |
| 2023/0124343 A1* | 4/2023 | Garcarz | H04L 45/26 709/223 |
| 2023/0124947 A1* | 4/2023 | Mermoud | H04L 45/24 709/224 |
| 2023/0128567 A1* | 4/2023 | Mermoud | H04L 45/08 709/223 |

(Continued)

*Primary Examiner* — John D Blanton
(74) *Attorney, Agent, or Firm* — BEHMKE INNOVATION GROUP LLC; James M. Behmke

(57) ABSTRACT

In one embodiment, a device deploys short timescale prediction model and a long timescale prediction model to one or more hosts in a network, whereby the short timescale prediction model predicts failure conditions for an online application that are attributable to the network on a timescale that is shorter than that of the long timescale prediction model. The device configures a trigger that causes the long timescale prediction model to activate predictions by the short timescale prediction model. The device evaluates performance of the short timescale prediction model. The device adjusts the trigger, when the performance of the short timescale prediction model is unacceptable.

20 Claims, 12 Drawing Sheets

(56) References Cited

U.S. PATENT DOCUMENTS

| | | | |
|---|---|---|---|
| 2023/0129290 A1* | 4/2023 | Kolar | H04L 41/5009 709/224 |
| 2023/0140115 A1* | 5/2023 | Vasseur | H04L 45/50 709/238 |
| 2023/0164029 A1* | 5/2023 | Mermoud | H04L 41/145 709/220 |
| 2023/0164045 A1* | 5/2023 | Vasseur | H04L 41/142 709/224 |
| 2023/0171181 A1* | 6/2023 | Vasseur | H04L 47/2425 370/252 |
| 2023/0171186 A1* | 6/2023 | Yelahanka | H04L 41/147 370/254 |
| 2023/0171190 A1* | 6/2023 | Vasseur | H04L 45/124 370/389 |
| 2023/0188455 A1* | 6/2023 | Vasseur | H04L 41/5009 370/229 |
| 2023/0188456 A1* | 6/2023 | Kolar | H04L 45/08 370/392 |

\* cited by examiner

CAPTURING NETWORK DYNAMICS AND FORECASTING ACROSS MULTIPLE TIMESCALES

TECHNICAL FIELD

The present disclosure relates generally to computer networks, and, more particularly, to capturing network dynamics and forecasting across multiple timescales.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, different metrics may have greater predictive power than those of others, for certain types of failures. Moreover, testing has shown that the timescales selected for such predictions can also have a significant effect on the overall performance of the predictive system. Indeed, certain failures may only be predictable by assessing specific metrics in a short time window and relying on a high frequency of telemetry collection. Conversely, other failures may be perfectly predictable using longer term windows and lower frequencies of telemetry collection.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
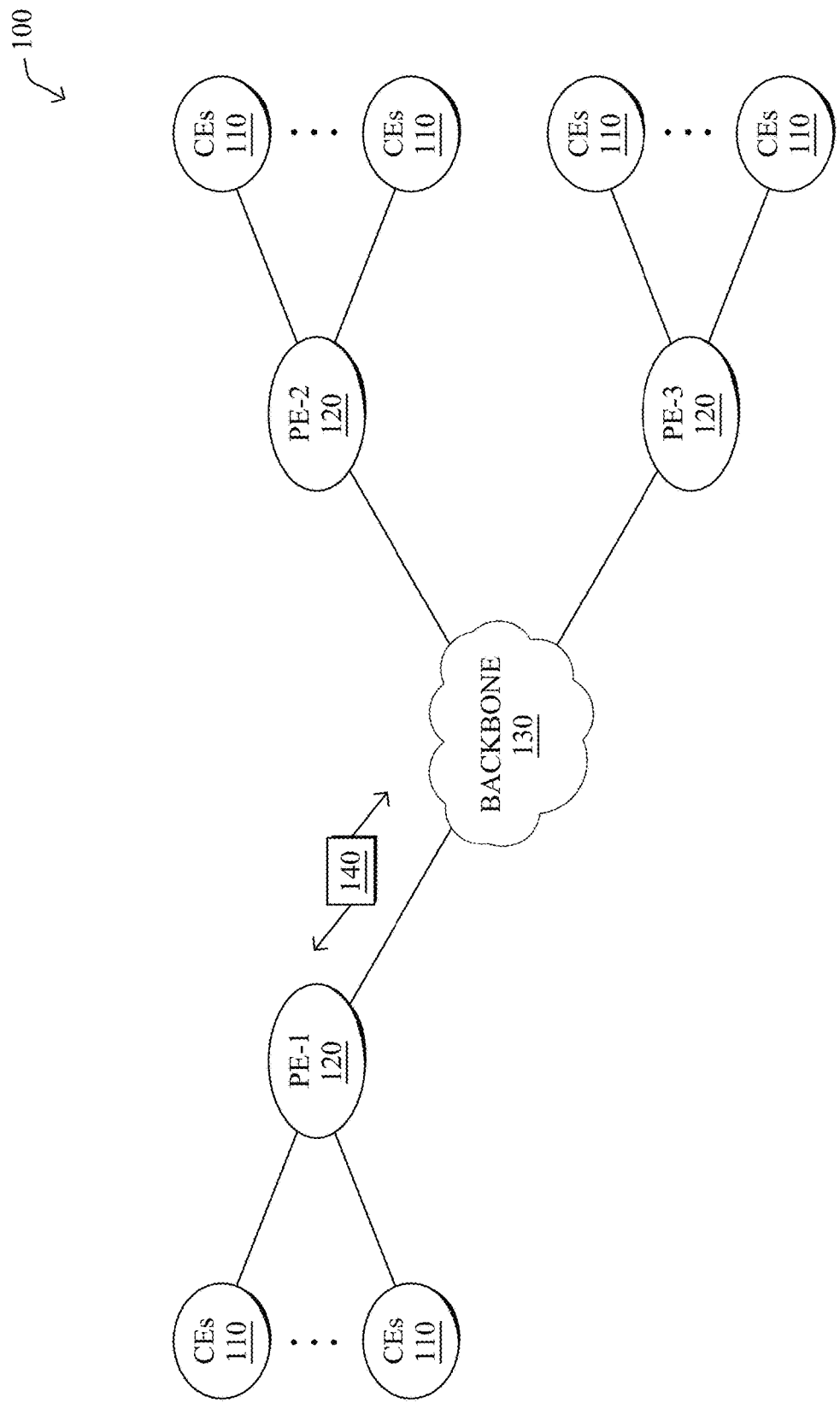
FIGS. 1A-1B illustrate an example communication network.

According to one or more embodiments of the disclosure, a device deploys short timescale prediction model and a long timescale prediction model to one or more hosts in a network, whereby the short timescale prediction model predicts failure conditions for an online application that are attributable to the network on a timescale that is shorter than that of the long timescale prediction model. The device configures a trigger that causes the long timescale prediction model to activate predictions by the short timescale prediction model. The device evaluates performance of the short timescale prediction model. The device adjusts the trigger, when the performance of the short timescale prediction model is unacceptable.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
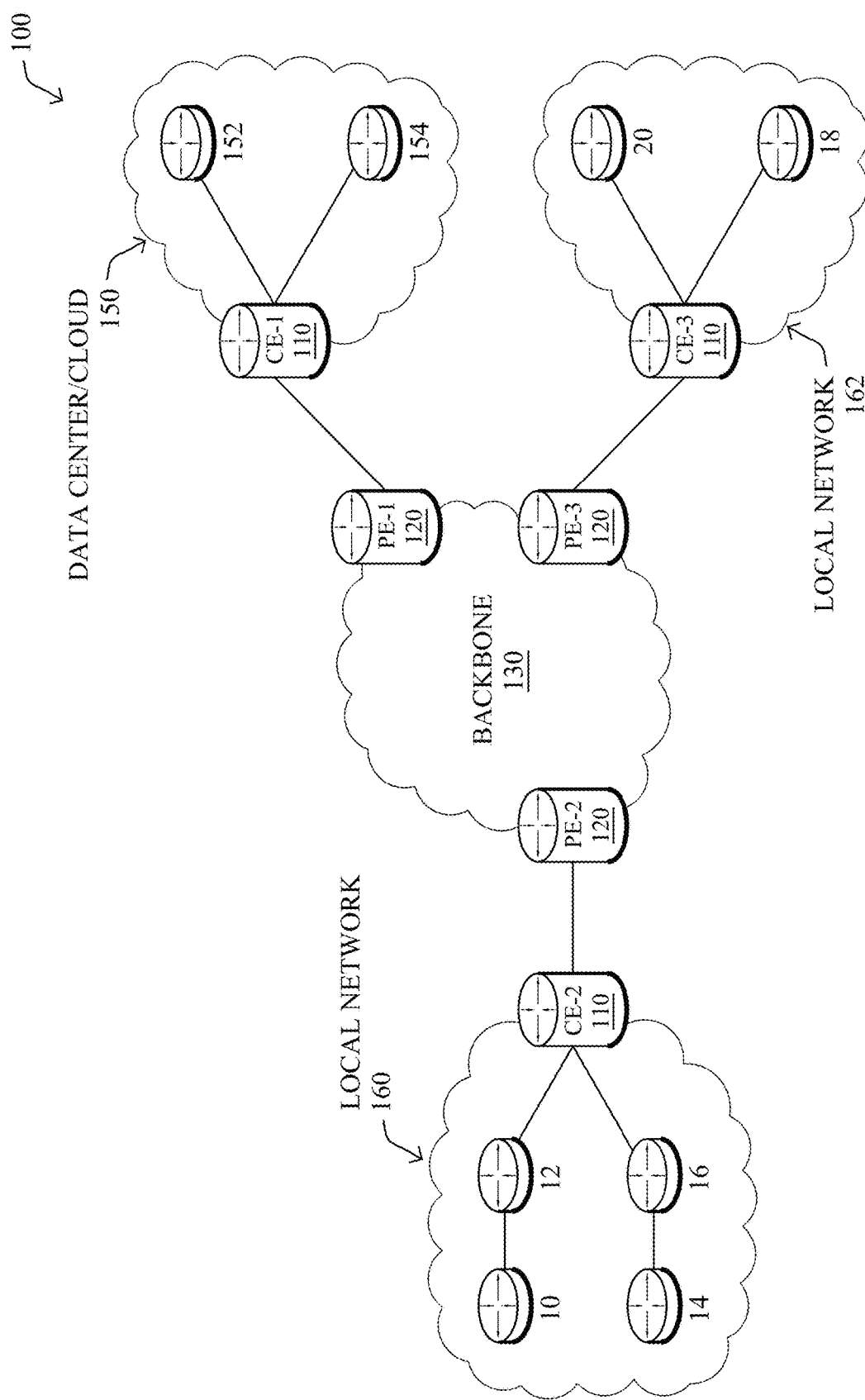

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
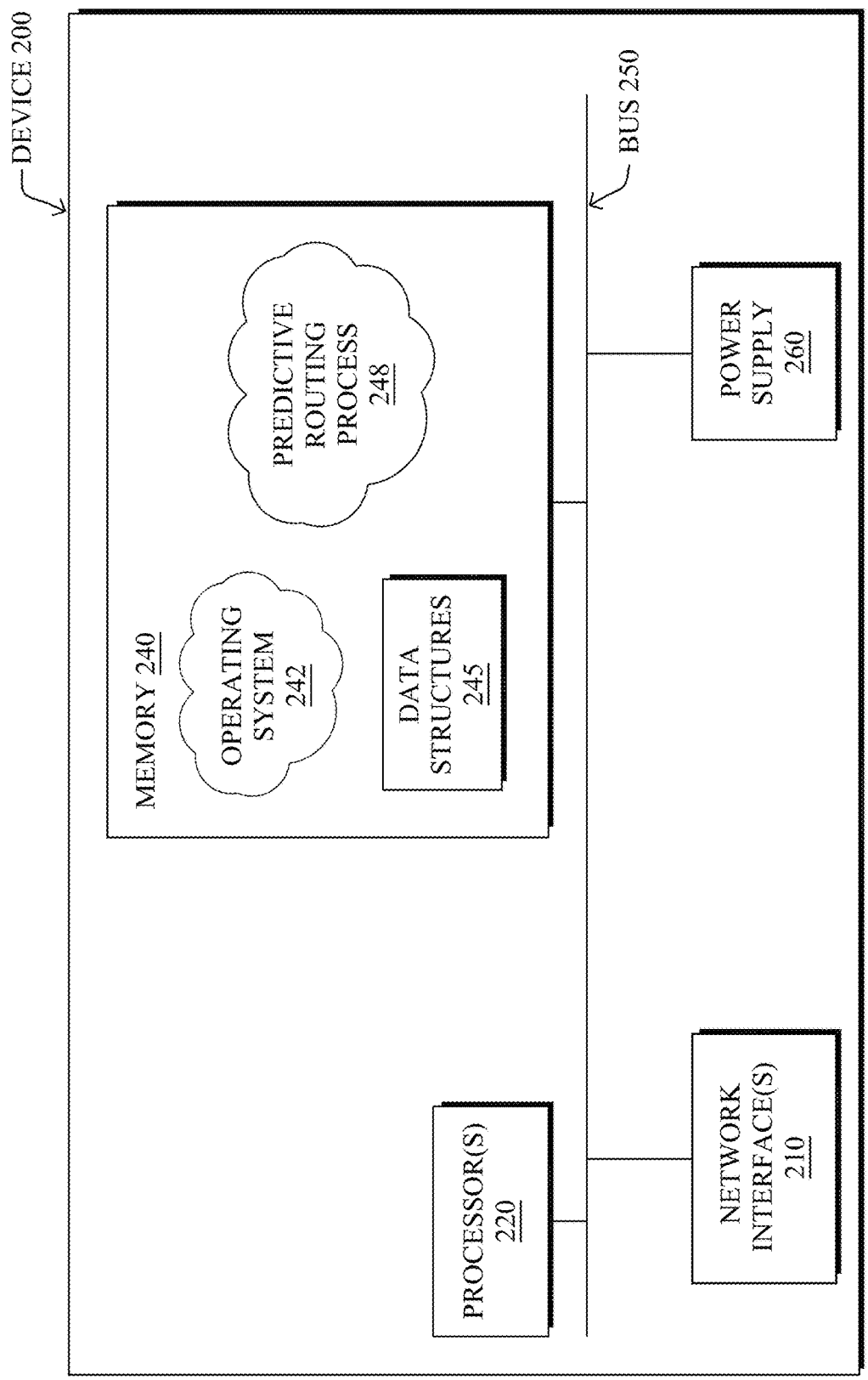
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
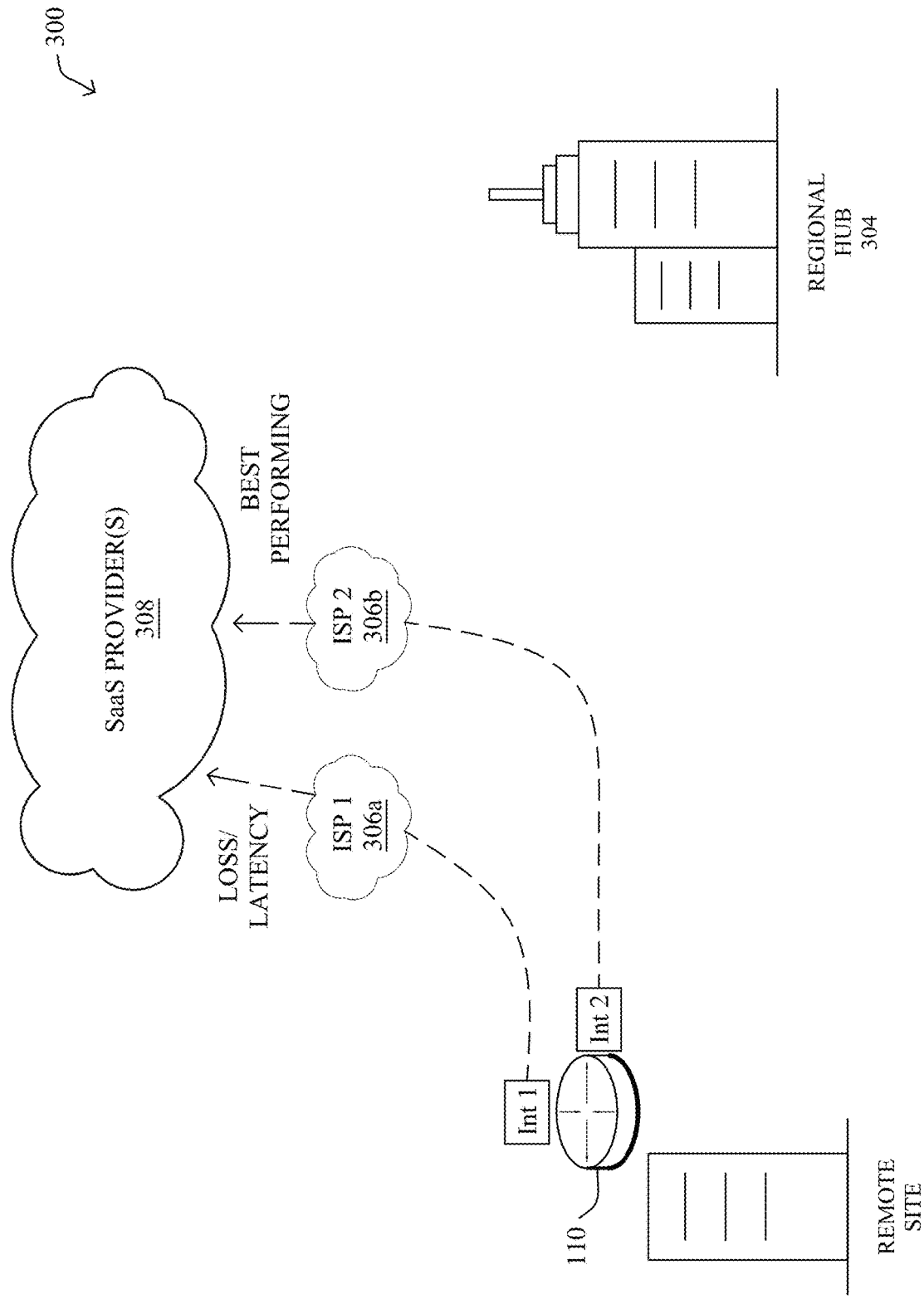
FIGS. 3A-3B illustrate example network deployments.
Figure 3B:
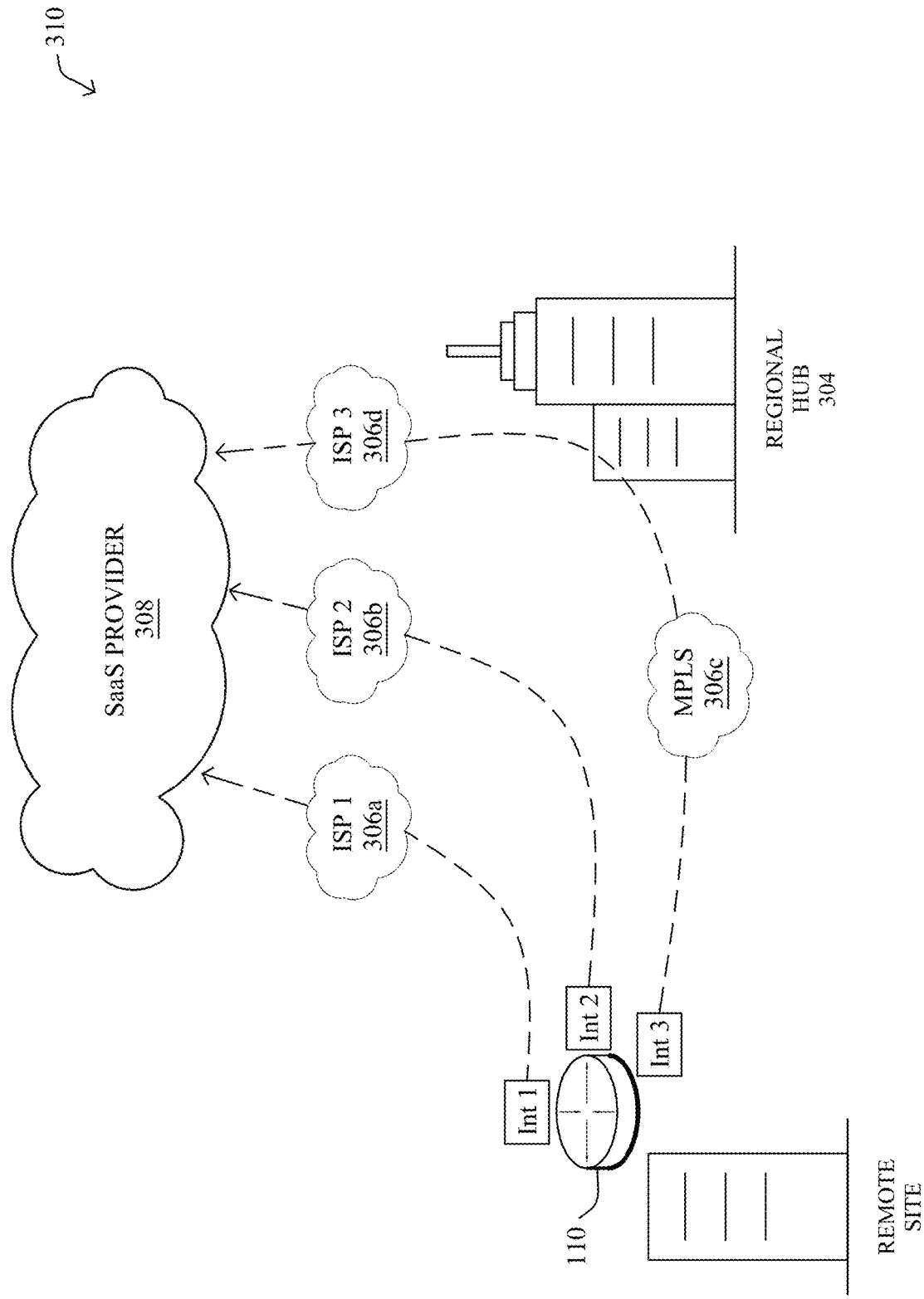

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
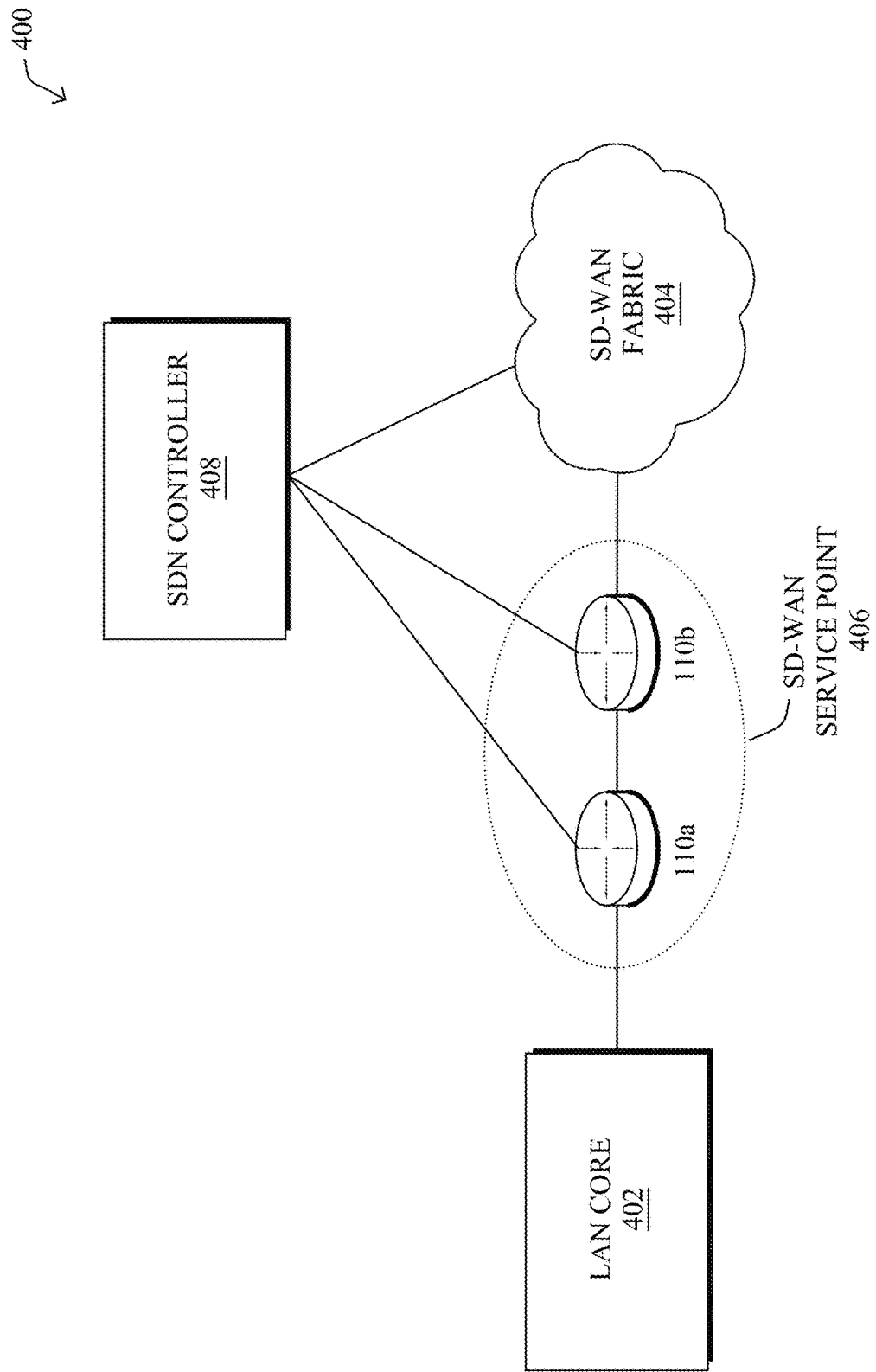
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
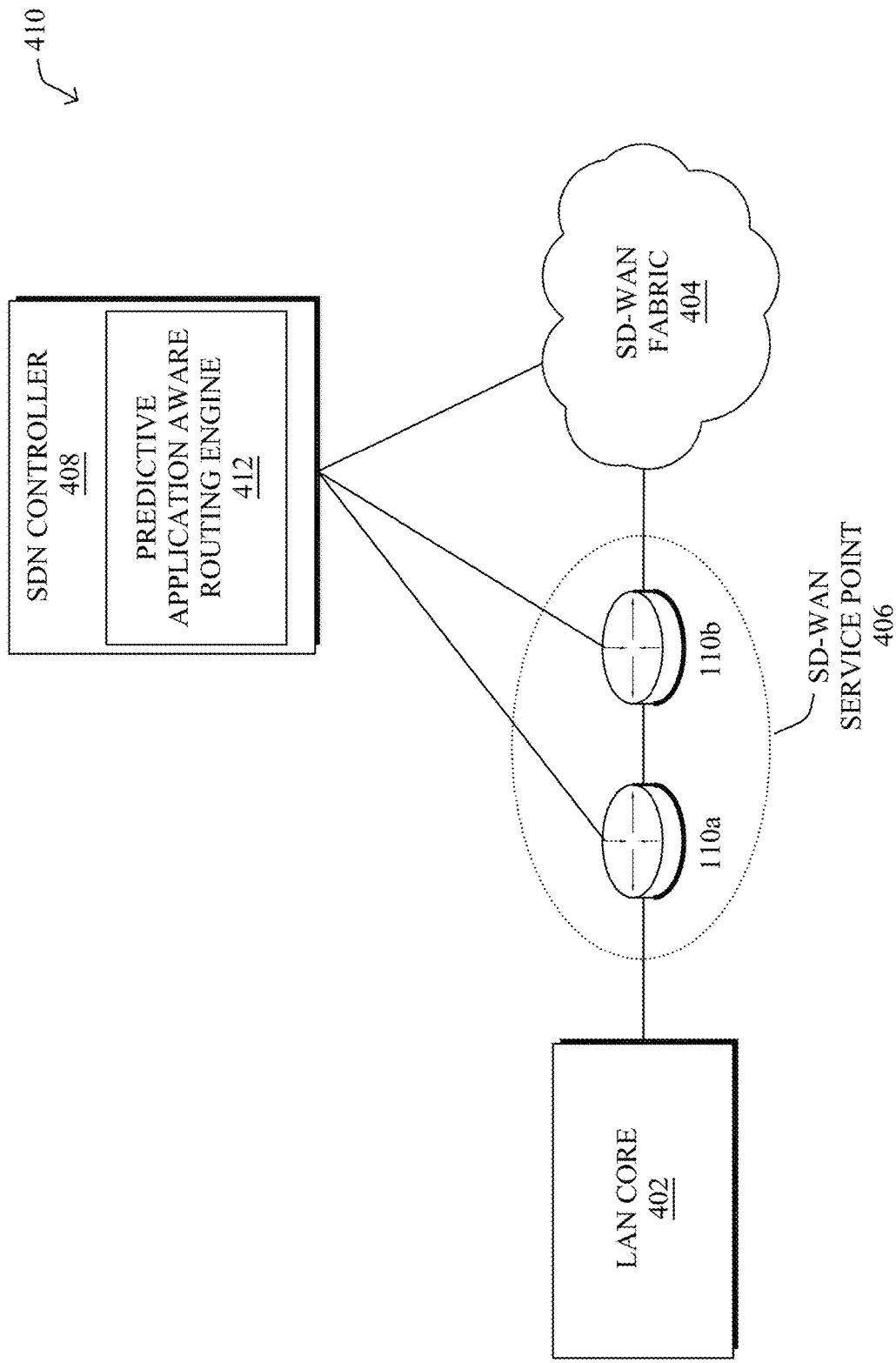

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As would be appreciated, modern SaaS applications are typically delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:

Obtaining user feedback directly from the application
Applying traffic analytics, such as by analyzing Netflow records that include extra metrics like Application Response Time (ART)
Sending synthetic path probes to measure networking metrics to each SaaS application from each location. These probes are 'synthetic' in that they seek to mimic the actual characteristics of the traffic of the application under scrutiny.

The first approach above is rarely used today because of its complexity, but can still be used with the techniques herein. Note that relying on direct user feedback to drive routing decisions would also require supporting application programming interfaces (APIs) and the relevant network telemetry, in order to optimize the routing. The second and third approaches above are well-suited for use in Secure Access Service Edge (SASE)/SD-WAN implementations.

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, application-driven, predictive routing systems, such as predictive application aware routing engine 412, allow for the prediction of SLA violations and application experience degradations along a path, in order to proactively reroute traffic along a preferable path, thus leading to improving application quality of experience. For illustrative purposes, such SLA violations, unacceptable QoE measurements, and the like, are collectively referred to herein as "application failures."

As would be appreciated, an application failure prediction model operates on a prediction timescale that is selected during generation of the model. On one end of the spectrum are prediction timescales that may predict failures on the order of seconds, minutes, hours, or even less. On the other end of the spectrum are prediction timescales that may predict failures on the order of days, weeks, or even longer. In addition, the predictive power of a certain network metric (e.g., jitter, loss, etc.) may vary considerably with the timescale selected for the prediction model.

It is often impractical to execute multiple prediction models at all times that operate on different prediction timescales, due to limited resources in the network. Indeed, from a telemetry collection standpoint, shorter prediction timescales necessitate the collection of the input metrics for the model at a much higher frequency than that of longer prediction timescales. For example, a failure prediction model that predicts failures weeks out may only need telemetry collected on a very granular scale (e.g., every hour). Conversely, a failure prediction model that predicts failures several seconds out may require the telemetry to be collected every second, or even less.

Today, application failure prediction models are typically selected to use longer prediction timescales, in recognition of the significant overhead presented by shorter prediction timescales. In terms of performance, these long timescale models are also often trained to exhibit very high precision, potentially at the cost of recall. Indeed, not predicting every failure may be completely acceptable, as the Internet is still entirely reactive. On the other hand, false positives may have a very detrimental effect on the application traffic, such as by causing the traffic to be needlessly rerouted.

In general, use of short timescale prediction models (e.g., those that make inferences every few seconds) is highly disfavored today because of the introduction of imbalanced events and the training datasets that would be required. However, their use is not without any merit. Indeed, consider a system capable of operating in (pseudo) real time with inferences made every five seconds. Such a system could take advantage of local phenomena on the router indicative of a failure happening in a very short period of time, which a long timescale prediction model would not be able to do.

Figure 5:
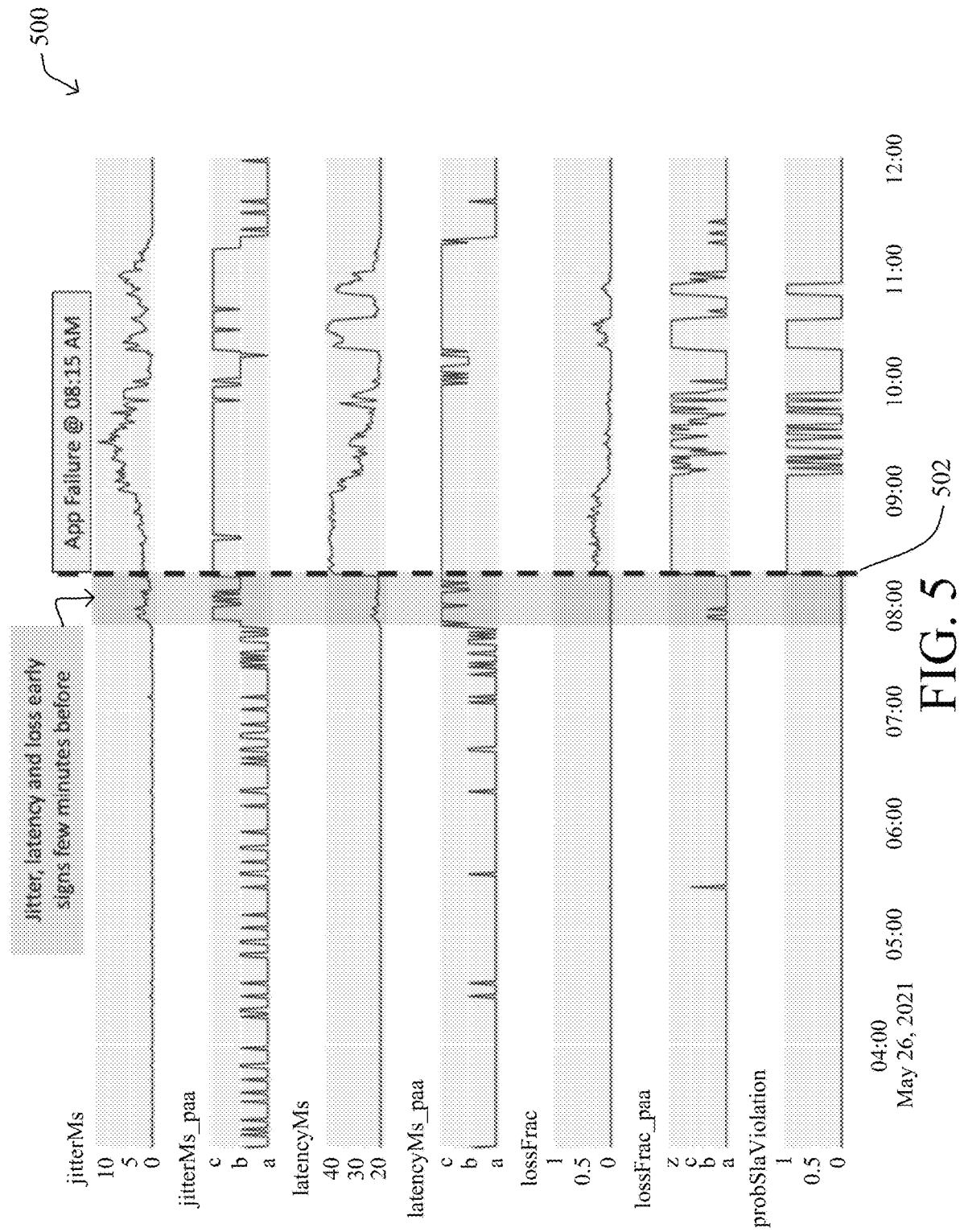
FIG. 5 illustrates an example plot of network metric timeseries leading up to a failure.

For example, FIG. 5 illustrates an example plot 500 of network metric timeseries leading up to a failure, in some embodiments. As shown, plot 500 includes timeseries for various metrics captured during testing for a network path: its measured jitter, the piecewise aggregate approximation (PAA) of its jitter, its measured latency, the PAA of its latency, its measured loss fraction (lossFrac), the PAA of its loss fraction, and the probability of the path exhibiting an SLA violation for a particular application (e.g., a voice application).

In some cases, the various metrics shown in FIG. 5 are represented using discrete states. For instance, the probability of an SLA violation is shown either as a zero (i.e., no SLA violation or 1 (i.e., SLA violation). The symbol set of {a, b, c, z} is used to represent the discrete categories of the PAAs of the jitter, latency, and loss fraction, where a=low, b=medium, c=high, and z=SLA violation along the path at a time t. Doing so allows the state of any given network path to be represented as a vector of discrete values.

As shown in plot 500, an application failure/SLA violation occurs at time 502 (i.e., at 8:15 AM). However, note that there are slight fluctuations in loss, latency, and jitter, only a few minutes before the actual SLA violation. This can be clearly seen by the discretized symbols going from low (a) to medium or high (b or c). There are slight fluctuations in the jitter and latency a few minutes before the actual violations. Such signals may only be recognizable by a failure prediction model that uses a short prediction timescale as precursors to the application failure.

Figure 6:
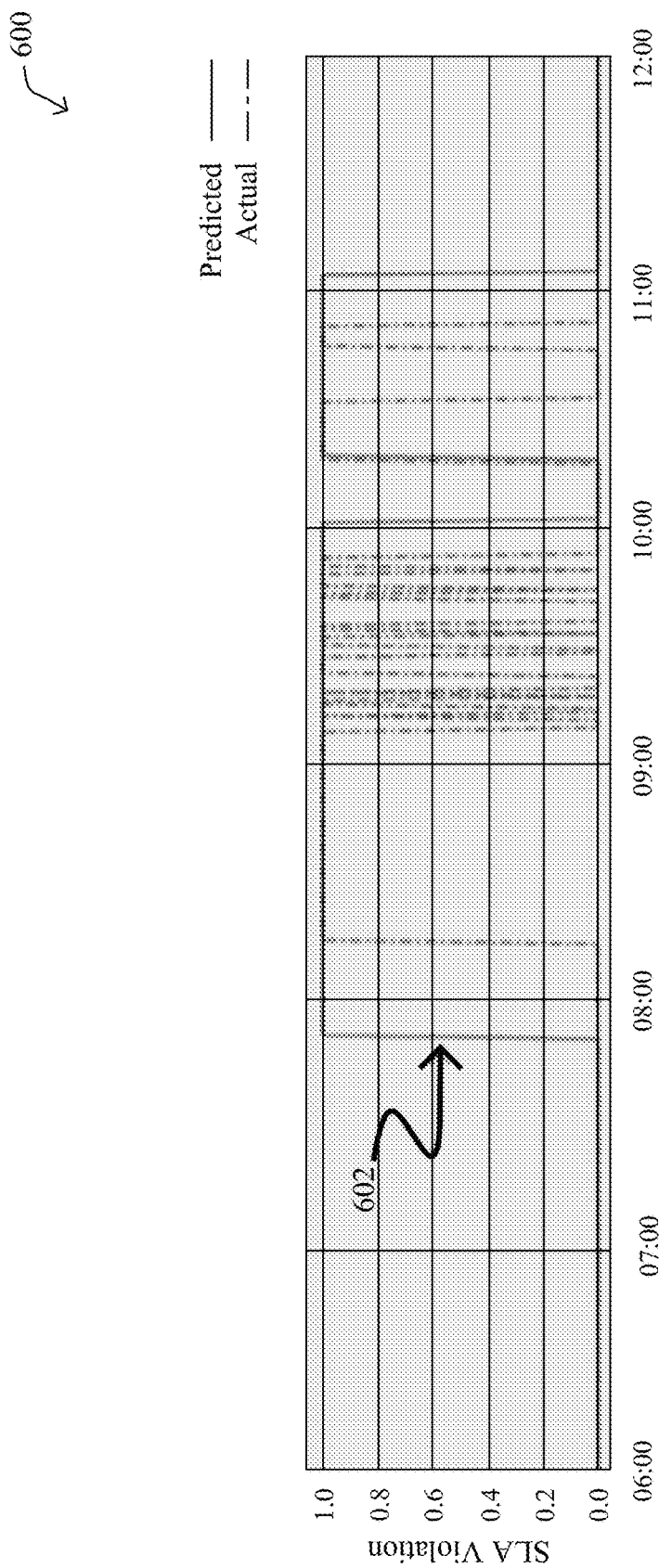
FIG. 6 illustrates an example plot of the service level agreement (SLA) violation timeseries from FIG. 5 versus forecast SLA violations.

FIG. 6 illustrates an example plot 600 of the SLA violation timeseries from FIG. 5 versus SLA violations forecast by a failure prediction model that uses a short prediction timescale, in various embodiments. More specifically, the prediction model was trained to assess the jitter, latency, and loss-related timeseries, as shown previously in FIG. 5, at a frequency of every five seconds. Here, it can be seen that the short timescale prediction model was able to correctly predict at time 602 that an SLA violation is imminent, well in advance of the actual SLA violation that occurs at 8:15.

From FIG. 5, one of the core challenges in simply utilizing a short timescale prediction model in a predictive routing system becomes self-evident: there is a large class imbalance between the two classes that the model is to predict (i.e., 'SLA violation' and 'no SLA violation'). Take, for instance, the example of one day of samples captured every five seconds throughout the day for a given network path. If ten failures occur during that day along that path, the total number of positive samples would then be 10 (potentially multiplied by some factor if multiple samples are used to detect the failure) versus 24*3600/5=17,280 samples. Since Precision=TP/(TP+FP) a very few FP would severely impact the precision of such a model. In other words, short timescale prediction models would be expected to predict extremely rare events from the standpoint of their timescales, meaning that they typically exhibit reduced prediction and leading to them traditionally be disfavored in predictive routing systems, despite their potential value.

——Capturing Network Dynamics and Forecasting Across Multiple Timescales——

The techniques introduced herein allow for the use of both long and short timescale failure prediction models in a network in an intelligent and optimized manner. In some aspects, the two types of modes may operate collaboratively with one another and their interactions controlled via a feedback mechanism that monitors the performance of the system. For instance, in one aspect, a long timescale prediction model may active predictions by a short timescale prediction model only when a trigger is met.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device deploys short timescale prediction model and a long timescale prediction model to one or more hosts in a network, whereby the short timescale prediction model predicts failure conditions for an online application that are attributable to the network on a timescale that is shorter than that of the long timescale prediction model. The device configures a trigger that causes the long timescale prediction model to activate predictions by the short timescale prediction model. The device evaluates performance of the short timescale prediction model. The device adjusts the trigger, when the performance of the short timescale prediction model is unacceptable.

Figure 7:
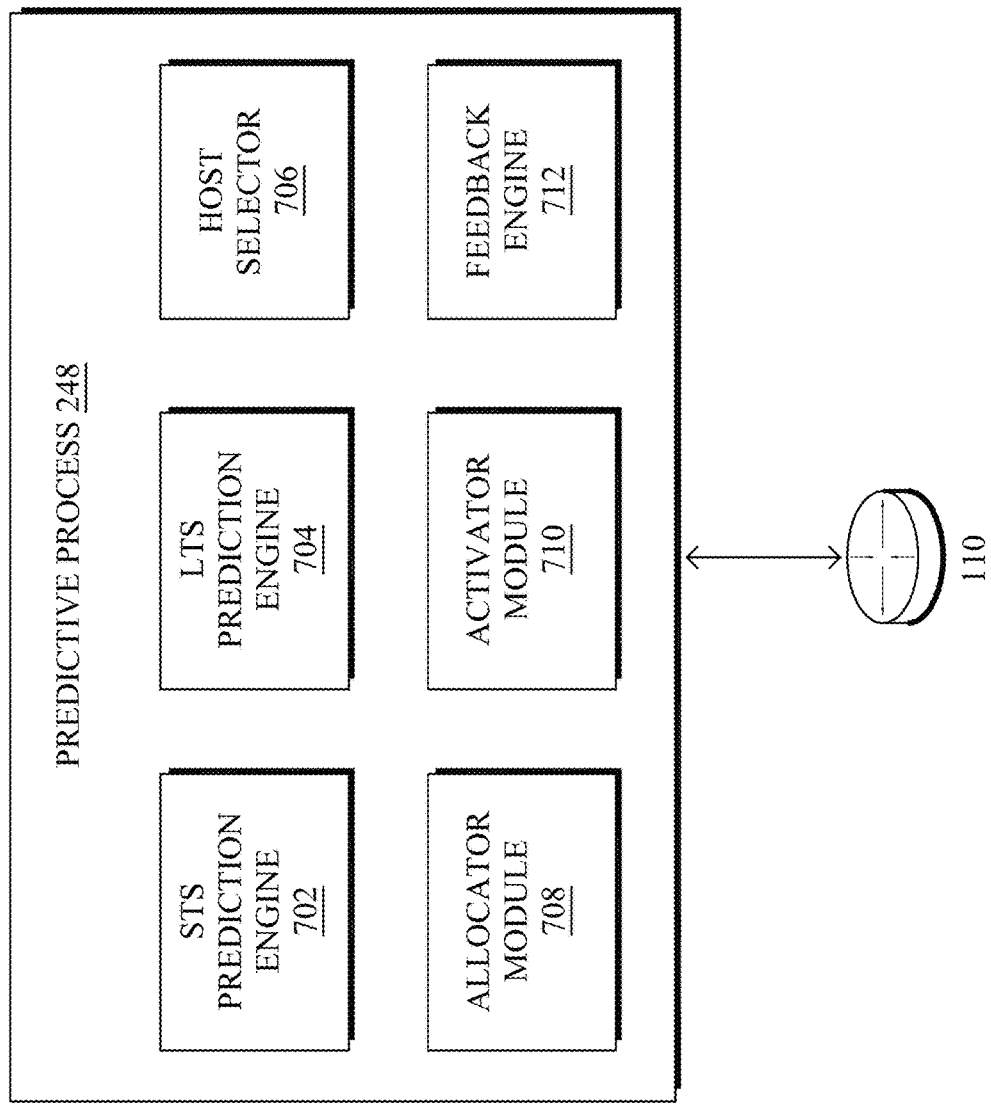
FIG. 7 illustrates an example architecture for capturing network dynamics and forecasting across multiple timescales.

Operationally, FIG. 7 illustrates an example architecture 700 for capturing network dynamics and forecasting across multiple timescales, according to various embodiments. At the core of architecture 700 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), another device or service in communication therewith, or the like. In some embodiments, for instance, predictive routing process 248 may be used to implement a predictive application aware routing engine, such as predictive application aware routing engine 412.

As shown, predictive routing process 248 may include any or all of the following components: a short timescale (STS) prediction engine 702, a long timescale (LTS) prediction engine 704, a host selector 706, an allocation module 708, an activity module 710, and/or a feedback engine 712. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

In general, a key aspect of architecture 700 is its ability to support the use of both LTS and STS prediction models working in conjunction with one another, such as part of a predictive routing system. For instance, an LTS prediction model may utilize a prediction timescale on the order of hours, days, weeks, or even long. Conversely, an STS prediction model may utilize a prediction timescale on the order of minutes, seconds, or even less. However, the terms "LTS" and "STS" are not intended to be limited to these timescale ranges, but rather to distinguish the lengths of their timescales relative to one another. As shown, STS prediction engine 702 may be configured to train and/or execute an STS prediction model capable of predicting application failures in a network on a short prediction timescale. Similarly, LTS prediction engine 704 may be configured to train and/or execute an LTS prediction model capable of predicting application failures in the network on a long prediction timescale.

In various embodiments, where each of prediction engines 702-704 is executed in the network may be controlled by predictive routing process 248, depending on the capabilities of the network and its constituent devices. In one embodiment, both of STS prediction engine 702 and LTS prediction engine 704 may be collocated, such as in the cloud or by a specific host in the network, such as router 110. In another embodiment, STS prediction engine 702 may be hosted on premise by router 110 or another networking device, while LTS prediction engine 704 is hosted in the cloud or otherwise remotely. Doing so would leverage the fact that the telemetry used as input by STS prediction engine 702 is available at a high frequency on router 110, thereby eliminating any additional latency in sending the telemetry to the cloud for analysis. In either case, STS prediction engine 702 and LTS prediction engine 704 may communicate using the custom messages described further below.

As would be appreciated, the input metrics/telemetry used by STS prediction engine 702 and LTS prediction engine 704 may be different from one another, in some embodiments. Indeed, the predictive power of certain metrics may increase or decrease, depending on the prediction timescale of the model. For instance, STS prediction engine 702 may use as input state information regarding a particular networking device (e.g., router 110), such as its CPU load, memory load, queue states, real-time events, and the like, which can be collected at a high frequency (e.g., on the order of seconds). However, LTS prediction engine 704 may or may not consider these metrics, as collection of them at a coarse granularity (e.g., one every hour) may not have much predictive power at longer timescales.

In various embodiments, host selector 706 may be configured to automatically discover devices capable of hosting STS prediction engine 702 and/or LTS prediction engine 704. For example, networking devices (e.g., router 110) may or may not be able to host either or both of STS prediction engine 702 and LTS prediction engine 704 within a container, a virtual machine (VM), or the like. To aid in this discovery, potential hosts, such as router 110 may provide information regarding their capabilities to host selector 706, either on a push or pull basis. Additional information such as the telemetry available on the potential host may also be advertised along with the relevant variables. I some embodiments, a routing protocol such as BGP may be used to advertise such capabilities (or alternatively an IGP such as OSPF or ISIS). Alternatively, custom message-passing can also be used to announce the capabilities of different potential hosts. Upon discovering all potential hosts, particularly for STS prediction engine 702, host selector 706 may start coupling at least LTS prediction engine 704 with those nodes, allowing for the exchange of messages.

Allocation module 708, in various embodiments, may be responsible for finding the optimal allocation of host(s) for STS prediction engine 702 and LTS prediction engine 704, in some embodiments. In one embodiment, allocation module 708 may gather the capabilities (e.g., CPU, storage, etc.) of each potential host, as well as data indicative of the cost of transmitting information between the hosts (e.g., latency between the hosts). In turn, allocation module 708 may then utilize an optimization algorithm (e.g., Mixed Integer Linear Programming, etc.), to allocate the best hosting points for STS prediction engine 702 and LTS prediction engine 704. In another embodiment, allocation module 708 may also leverage input from a user via a user interface, to make its host selections. For instance, allocation module 708 may provide information regarding the potential hosts for display (e.g., their capabilities, locations, etc.), and potentially its suggested allocations, as well. The user can then choose where to host STS prediction engine 702 and LTS prediction engine 704, such as by manually specifying their hosts or accepting the allocations suggested by allocation module 708.

In various embodiments, activity module 710 may be responsible for configuring a trigger that causes LTS prediction engine 704 at its selected host to activate STS prediction engine 702 at its respective host. In other words, STS prediction engine 702 may only become active when the one or more conditions of the trigger are first met. In some embodiments, these conditions may include, but are not limited to, any or all of the following: the prediction(s) made by LTS prediction engine 704, the time of day, the day of the week, or the like.

By way of example, assume that LTS prediction engine 704 makes predictions using a prediction timescale on the order of hours. When used in isolation, LTS prediction engine 704 may be optimized during training to exhibit a high precision, which may come at the cost of lower recall, for the reasons stated previously (i.e., to avoid the harm of false positives). However, a key aspect herein is that LTS prediction engine 704 does not need to function in isolation, but can work collaboratively with STS prediction engine 702, as well. Thus, in some embodiments, this allows LTS prediction engine 704 to instead be configured for higher recall and lower precision, when coupled with STS prediction engine 702 that is configured for higher precision and lower relative recall. In combination, the potential risks of false positives by LTS prediction engine 704 are greatly reduced.

Once the trigger of LTS prediction engine 704 is met, it may notify STS prediction engine 702 to begin making predictions/inferences at a higher frequency than that of LTS prediction engine 704 leveraging the rich telemetry available on premise. This allows STS prediction engine 702 to 'zoom in' on the potential failure. Another strong benefit of this approach is to avoid the very undesirable effect of drastically impacting the precision of STS prediction engine 702 which, by its very nature, makes predictions on highly unbalanced datasets (i.e., the prediction of rare events).

Figure 8:
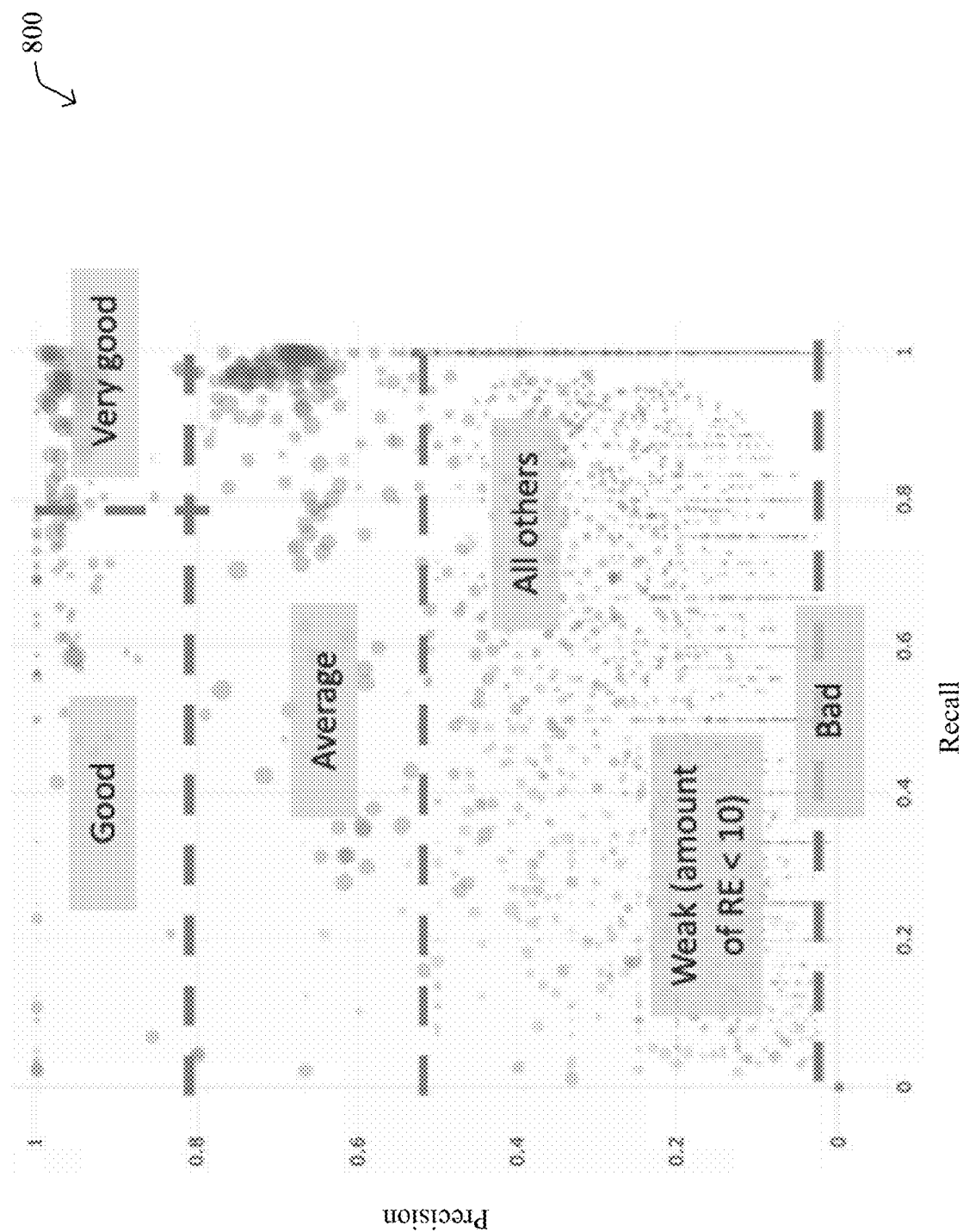
FIG. 8 illustrates an example precision-recall plot for a short timescale forecasting model for different network paths.

Various approaches are possible with respect to the trigger configured by activity module 710, in several embodiments. In one embodiment, the precision and recall for each path is compared between STS prediction engine 702 and LTS prediction engine 704, as part of the trigger decision. For example, FIG. 8 illustrates an example precision-recall plot 800 for a short timescale prediction/forecasting model for different network paths. Each dot in plot 800 represents one network path and the size of the dot indicates the number of application failures along that path. Few paths have a very high precision with decent recall. For example, paths with precision of STS ($P_{STS}$)>0.8 and recall ($R_{STS}$)>0.8 are marked as "very good." Similarly, other groups are also marked for STS prediction. Accordingly, STS prediction engine 702 may only be activated for such 'good' or 'very good' paths from precision-recall plot 800, whereas LTS prediction engine 704 may be used to make the sole predictions for all other paths. In yet another embodiment, the trigger for STS prediction engine 702 may comprise a rule such as: "activate STS prediction engine 702 on all paths where $P_{STS}$>0.9 & $R_{STS}$>0.2 & $P_{LTS}$<0.9 & $R_{LTS}$>0.2," or other rule that is based in part on the performance(s) of STS prediction engine 702 and/or LTS prediction engine 704 for that path.

Upon predicting an event of interest, such as a failure, which triggers the trigger of LTS prediction engine 704, LTS prediction engine 704 may send a custom activation message to STS prediction engine 702, to activate its predictions. In turn, if STS prediction engine 702 also predicts such a failure, it may return a custom message back to LTS prediction engine 704 that is indicative of its own prediction and potentially other parameters, as well (e.g., a confidence metric for the prediction, etc.).

In one embodiment, LTS prediction engine 704 may then decide to confirm the prediction and potentially close the loop by triggering an action to the controller, such as by causing the controller to proactively reroute the application traffic. In another embodiment, STS prediction engine 702 may be authorized to initiate a mitigation action (e.g., initiating a traffic reroute), locally, when it also predicts the failure. For example, assume that STS prediction engine 702 has been deployed to router 110 in FIG. 7. In such a case, router 110 may be instructed by STS prediction engine 702 to perform a local reroute of the traffic, immediately, thereby avoiding having to first notify LTS prediction engine 704 of its prediction, to cause the traffic to ultimately be rerouted by the controller.

Illustratively, LTS prediction engine 704 and STS prediction engine 702 may operate in a manner akin to human vision whereby the resolution of an object is coarse when it is far away, but increases as the object gets closer.

Finally, feedback engine 712 may be responsible for monitoring the performances of STS prediction engine 702 and LTS prediction engine 704 and making adjustments to the trigger, accordingly, in some embodiments. In one embodiment, when STS prediction engine 702 is triggered by LTS prediction engine 704, it may determine its performance metric(s) in the last few hours of being triggered, or some other timespan. Such performance metrics may take the form of true positives, false positives, false negatives, precision, recall, or the like. If the performance of STS prediction engine 702 is deemed 'bad' by feedback engine 712 (e.g., its precision<0.5 when it has failed to detect at least n-number of application failures), feedback engine 712 may adjust the trigger used by LTS prediction engine 704 so as not to activate STS prediction engine 702 for that path.

In other embodiments, feedback engine 712 may maintain a record as to which times the performance metrics of STS prediction engine 702 are acceptable or not. Based on this, it may adjust the trigger of LTS prediction engine 704 so as to avoid activating STS prediction engine 702 during certain hours of the day, days of the week, months, etc. For instance, if the precision of STS prediction engine 702 is high during working hours on weekdays, but low during non-working hours, feedback engine 712 may adjust the trigger of LTS prediction engine 704 to avoid activating STS prediction engine 702 during those non-working hours, regardless of whether LTS prediction engine 704 predicts a failure or not.

In yet further embodiments, rather than adjusting the trigger of LTS prediction engine 704, feedback engine 712 may opt to tune the parameters of STS prediction engine 702 to instead yield better precision than its current configuration. Of course, doing so will likely be at the cost of also reducing its recall. Of course, while feedback engine 712 is shown as a separate module, its functionality could also be integrated directly into the operations of STS prediction engine 702 and LTS prediction engine 704, as well. For instance, STS prediction engine 702 may report its performance metrics to LTS prediction engine 704, which then adjusts its trigger, accordingly.

Figure 9:
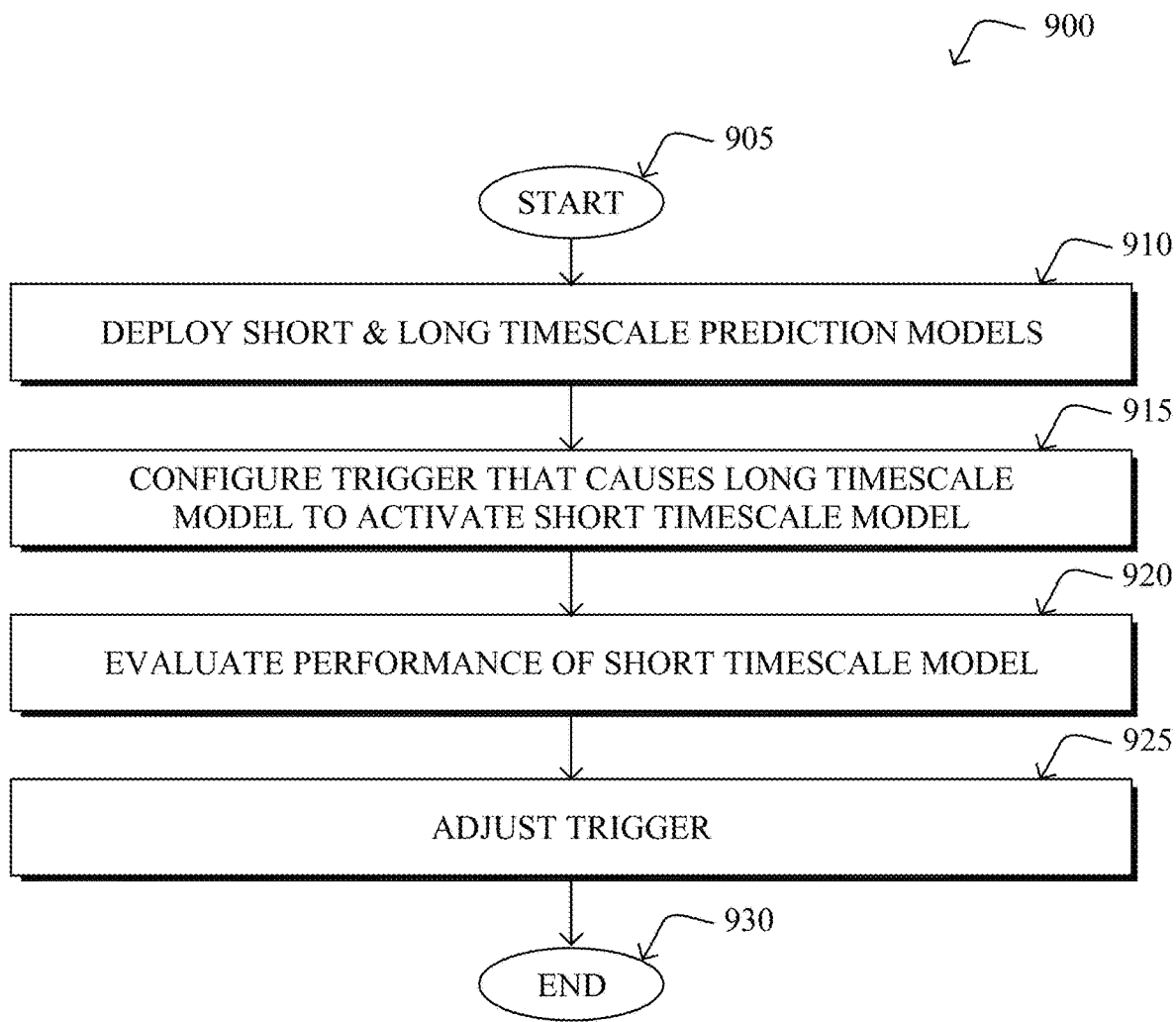
FIG. 9 illustrates an example simplified procedure for capturing network dynamics and forecasting across multiple timescales.

FIG. 9 illustrates an example simplified procedure 900 (e.g., a method) for capturing network dynamics and forecasting across multiple timescales, in accordance with one or more embodiments described herein. For example, a non-generic, specifically configured device (e.g., device 200), such as controller for a network (e.g., an SDN controller, a cloud-based device, etc.), an edge router, or other device in communication therewith, may perform procedure 900 by executing stored instructions (e.g., predictive routing process 248). The procedure 900 may start at step 905, and continues to step 910, where, as described in greater detail above, the device may deploy a short timescale prediction model and a long timescale prediction model to one or more hosts in a network, whereby the short timescale prediction model predicts failure conditions for an online application that are attributable to the network on a timescale that is shorter than that of the long timescale prediction model. In one embodiment, the failure conditions comprise service level agreement (SLA) violations by a path in the network via which traffic for the online application is conveyed. In another embodiment, the failure conditions comprise an application experience metric falling below an acceptable threshold. For instance, the application experience metric may be based on satisfaction ratings provided by users of the online application. In another embodiment, the device may deploy the prediction models to the host(s) based in part on an expected latency between those models. In a further embodiment, the device may deploy the models in part by providing, to a user interface, resource information regarding potential hosts in the network and receiving, from the user interface, a selection of the one or more hosts from among the potential hosts in the network. In yet another embodiment, the long timescale prediction model and the short timescale prediction model assess different metrics from the network to make their predictions.

At step 915, as detailed above, the device may configure a trigger that causes the long timescale prediction model to activate predictions by the short timescale prediction model. In one embodiment, one condition for the trigger may be the long timescale prediction model predicting a failure within a certain time window. In further embodiments, another potential condition for the trigger may be a specific time period. For instance, the long timescale prediction model may only be allowed to active the short timescale prediction model on certain days, certain times of day, etc. In additional embodiments, other potential conditions for the trigger may be one or more network paths in the network, one or more network entities (e.g., a service provider, an endpoint location, etc.), the identity of the online application (e.g., the short timescale prediction model may only be activated for certain types of application traffic), or the like. In yet another embodiment, the short timescale prediction model causes traffic for the online application to be rerouted in the network in advance of a predicted failure condition by the short timescale prediction model.

At step 920, the device may evaluate performance of the short timescale prediction model, as described in greater detail above. For instance, the performance of the short timescale prediction model may comprise metrics such as recall, precision, true positive rate, true negative rate, etc. In some embodiments, the long timescale prediction model is trained to have a higher recall and lower precision than that of the short timescale prediction model. In various embodiments, the short timescale prediction model may be configured to track such performance metric(s) over time and report them to the device for review. In other embodiments, either device itself or another device operating in conjunction therewith may track the performance metric(s) for either or both of the prediction models. In a further embodiment, the short timescale prediction model takes as input telemetry data from the network that is captured at a higher frequency than that used by the long timescale prediction model.

At step 925, as detailed above, the device may adjust the trigger, when the performance of the short timescale prediction model is unacceptable. In one embodiment, the device may do so by adjusting a time period during which the long timescale prediction model is allowed to active predictions by the short timescale prediction model. For instance, if the short timescale prediction model is found to perform poorly at certain times of the day, the device may adjust the trigger to avoid the long timescale prediction model activating the short timescale prediction model during these times. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Accordingly, the techniques herein help to alleviate some of the tradeoffs to be made between choosing to deploy a short timescale prediction model or a long timescale prediction model to a network by leveraging both types of models in an intelligent manner. Being able to combine such models allows for the design of more efficient predictive routing systems.

While there have been shown and described illustrative embodiments that provide for capturing network dynamics and forecasting across multiple timescales, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    deploying, by a device, a short timescale prediction model and a long timescale prediction model to one or more hosts in a network, whereby the short timescale prediction model predicts failure conditions for an online application that are attributable to the network on a timescale that is shorter than that of the long timescale prediction model;
    configuring, by the device, a trigger that causes the long timescale prediction model to activate predictions by the short timescale prediction model;
    evaluating, by the device, performance of the short timescale prediction model; and adjusting, by the device, the trigger, when the performance of the short timescale prediction model is unacceptable.

2. The method as in claim 1, wherein the failure conditions comprise service level agreement (SLA) violations by a path in the network via which traffic for the online application is conveyed.

3. The method as in claim 1, wherein the failure conditions comprise an application experience metric falling below an acceptable threshold, and wherein the application experience metric is based on satisfaction ratings provided by users of the online application.

4. The method as in claim 1, wherein the device deploys the short timescale prediction model and the long timescale prediction model to the one or more hosts in a network, based in part on an expected latency between those models.

5. The method as in claim 1, wherein the long timescale prediction model is trained to have a higher recall and lower precision than that of the short timescale prediction model.

6. The method as in claim 1, wherein deploying the short timescale prediction model and the long timescale prediction model to the one or more hosts in a network comprises:
providing, by the device and to a user interface, resource information regarding potential hosts in the network; and
receiving, at the device and from the user interface, a selection of the one or more hosts from among the potential hosts in the network.

7. The method as in claim 1, wherein the long timescale prediction model and the short timescale prediction model assess different metrics from the network to make their predictions.

8. The method as in claim 1, wherein the short timescale prediction model causes traffic for the online application to be rerouted in the network in advance of a predicted failure condition by the short timescale prediction model.

9. The method as in claim 1, wherein adjusting the trigger comprises:
adjusting a time period during which the long timescale prediction model is allowed to active predictions by the short timescale prediction model.

10. The method as in claim 1, wherein the short timescale prediction model takes as input telemetry data from the network that is captured at a higher frequency than that used by the long timescale prediction model.

11. An apparatus, comprising:
one or more network interfaces;
a processor coupled to the one or more network interfaces and configured to execute one or more processes; and
a memory configured to store a process that is executable by the processor, the process when executed configured to:
deploy a short timescale prediction model and a long timescale prediction model to one or more hosts in a network, whereby the short timescale prediction model predicts failure conditions for an online application that are attributable to the network on a timescale that is shorter than that of the long timescale prediction model;
configure a trigger that causes the long timescale prediction model to activate predictions by the short timescale prediction model;
evaluate performance of the short timescale prediction model; and
adjust the trigger, when the performance of the short timescale prediction model is unacceptable.

12. The apparatus as in claim 11, wherein the failure conditions comprise service level agreement (SLA) violations by a path in the network via which traffic for the online application is conveyed.

13. The apparatus as in claim 11, wherein the failure conditions comprise an application experience metric falling below an acceptable threshold, and wherein the application experience metric is based on satisfaction ratings provided by users of the online application.

14. The apparatus as in claim 11, wherein the apparatus deploys the short timescale prediction model and the long timescale prediction model to the one or more hosts in a network, based in part on an expected latency between those models.

15. The apparatus as in claim 11, wherein the long timescale prediction model is trained to have a higher recall and lower precision than that of the short timescale prediction model.

16. The apparatus as in claim 11, wherein the apparatus deploys the short timescale prediction model and the long timescale prediction model to the one or more hosts in a network by:
providing, to a user interface, resource information regarding potential hosts in the network; and
receiving, from the user interface, a selection of the one or more hosts from among the potential hosts in the network.

17. The apparatus as in claim 11, wherein the long timescale prediction model and the short timescale prediction model assess different metrics from the network to make their predictions.

18. The apparatus as in claim 11, wherein the short timescale prediction model causes traffic for the online application to be rerouted in the network in advance of a predicted failure condition by the short timescale prediction model.

19. The apparatus as in claim 11, wherein the apparatus adjusts the trigger by:
adjusting a time period during which the long timescale prediction model is allowed to active predictions by the short timescale prediction model.

20. A tangible, non-transitory, computer-readable medium storing program instructions that cause a device to execute a process comprising:
deploying, by the device, a short timescale prediction model and a long timescale prediction model to one or more hosts in a network, whereby the short timescale prediction model predicts failure conditions for an online application that are attributable to the network on a timescale that is shorter than that of the long timescale prediction model;
configuring, by the device, a trigger that causes the long timescale prediction model to activate predictions by the short timescale prediction model;
evaluating, by the device, performance of the short timescale prediction model; and
adjusting, by the device, the trigger, when the performance of the short timescale prediction model is unacceptable.

* * * * *